United States Patent
Philippe et al.

(10) Patent No.: US 10,771,817 B2
(45) Date of Patent: Sep. 8, 2020

(54) METHOD FOR DECODING A DIGITAL IMAGE, CODING METHOD, DEVICES, AND ASSOCIATED COMPUTER PROGRAMS

(71) Applicant: B<>COM, Cesson Sevigne (FR)

(72) Inventors: Pierrick Philippe, Melesse (FR); Victorien Lorcy, Rennes (FR); Pierre Castel, Saint Martin des Champs (FR)

(73) Assignee: B<>COM, Cesson Sevigne (FR)

( * ) Notice: Subject to any disclaimer, the term of this patent is extended or adjusted under 35 U.S.C. 154(b) by 0 days.

(21) Appl. No.: 16/092,359

(22) PCT Filed: Apr. 5, 2017

(86) PCT No.: PCT/FR2017/050817
§ 371 (c)(1),
(2) Date: Oct. 9, 2018

(87) PCT Pub. No.: WO2017/187040
PCT Pub. Date: Nov. 2, 2017

(65) Prior Publication Data
US 2019/0158878 A1    May 23, 2019

(30) Foreign Application Priority Data
Apr. 26, 2016 (FR) ..................... 16 53704

(51) Int. Cl.
*H04N 19/625* (2014.01)
*H04N 19/176* (2014.01)
(Continued)

(52) U.S. Cl.
CPC ......... *H04N 19/625* (2014.11); *H04N 19/119* (2014.11); *H04N 19/122* (2014.11);
(Continued)

(58) Field of Classification Search
CPC .. H04N 19/625; H04N 19/119; H04N 19/122; H04N 19/147; H04N 19/176; H04N 19/184
(Continued)

(56) References Cited

PUBLICATIONS

Yuan Yuan et al. "CE2: Non-Square Quadtree Transform for symmetric motion partitions", 97. MPEG Meeting Jul. 18, 2011-Jul. 22, 2011; Torino (Motion Picture Expert Group or ISO/IEC JTC1/SC29/WG11), No. m20837. Jul. 12, 2011.
(Continued)

*Primary Examiner* — Nguyen T Truong
(74) *Attorney, Agent, or Firm* — David D. Brush; Westman, Champlin & Koehler, P.A.

(57) ABSTRACT

A method for decoding a current block of a digital image. The method includes: decoding coefficients of the current block; and transforming the current block into a decoded block, by implementing a first sub step to produce an intermediate block, that applies to the column and row vectors of the current block, and a second substep to produce a block of pixels that applies to the row and column vectors of the intermediate block, resulting from the first substep; and rebuilding the image from the decoded block. At least one of the first and second substeps includes, for an input row or column vector: forming a first subvector of size K<N or N respectively from adjacent elements of the input vector; transforming the first subvector into a first transformed subvector by applying a partial subtransform of size K×K; and building the transformed vector by inserting the first transformed subvector.

12 Claims, 7 Drawing Sheets

Figures 1, 2A, 2B:
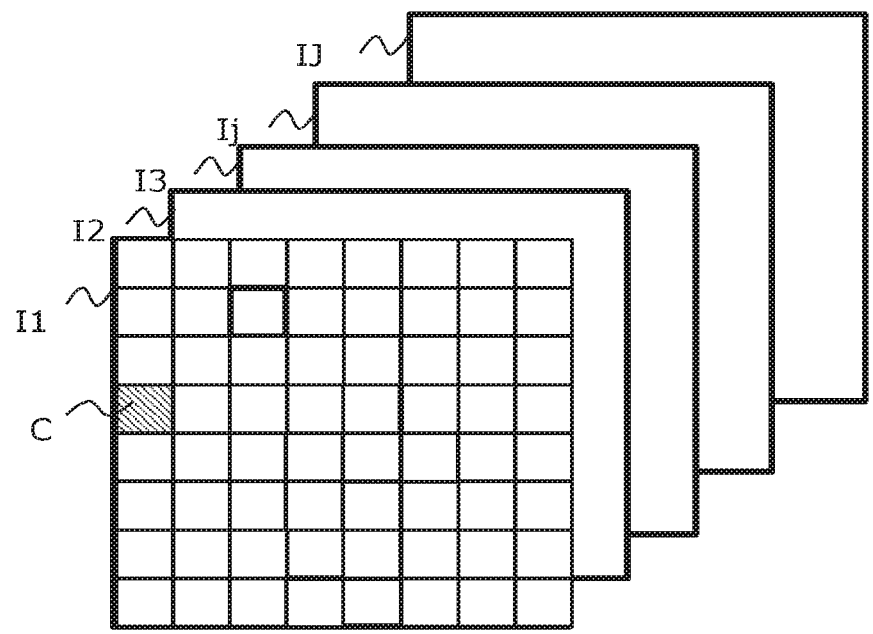

(51) Int. Cl.
- H04N 19/122 (2014.01)
- H04N 19/147 (2014.01)
- H04N 19/119 (2014.01)
- H04N 19/184 (2014.01)

(52) U.S. Cl.
CPC ......... *H04N 19/147* (2014.11); *H04N 19/176* (2014.11); *H04N 19/184* (2014.11)

(58) Field of Classification Search
USPC ...................................................... 375/240.2
See application file for complete search history.

(56) References Cited

PUBLICATIONS

Gary J. Sullivan et al. "Overview of the High Efficiency Video Coding (HEVC) Standard." IEEE Transactions on Circuits and Systems for Video Technology., vol. 22, No. 12. Dec. 1, 2012.

Xin Zhao et al. "Rate-Distortion Optimized Transform." 90. MPEG Meeting; Oct. 26, 2009-Oct. 30, 2009; XIAN; (Motion Picture Expert Group or ISO/IEC JTC1/SC29/WG11), No. M16926. Nov. 2, 2009.

"High efficiency coding and media delivery in heterogeneous environments—Part 2: High efficiency video coding." ISO/IEC 23008-2:2013, International Organization for Standardization. Nov. 2013.

Markus Puschel et al. "Algebraic Signal Processing Theory: Cooley-Tukey Type Algorithms for DCTs and DSTs." IEEE Transactions on Signal Processing. Apr. 2008.

Arrufat et al. "Low Complexity Transform Competition for HEVC", Proceedings of the ICASSP. Mar. 2016.

French Search Report and Written Opinion dated Sep. 19, 2016 for corresponding French Application No. 1653704, filed Apr. 26, 2016.

International Search Report dated Jul. 26, 2017 for corresponding International Application No. PCT/FR2017/050817, filed Apr. 5, 2017.

Written Opinion of the International Searching Authority dated Jul. 26, 2017 for corresponding International Application No. PCT/FR2017/050817, filed Apr. 5, 2017.

Sezer et al., "Sparse Orthonormal Transforms for Image Compression", Center for Signal and Image Processing, Georgia Institute of Technology, Atlanta, GA 30308, USA DoCoMo Comm. Laboratories USA Inc., Palo Alto, CA 94304, USA, 2008 IEEE.

METHOD FOR DECODING A DIGITAL IMAGE, CODING METHOD, DEVICES, AND ASSOCIATED COMPUTER PROGRAMS

1. CROSS-REFERENCE TO RELATED APPLICATIONS

This application is a Section 371 National Stage Application of International Application No. PCT/FR2017/050817, filed Apr. 5, 2017, the content of which is incorporated herein by reference in its entirety, and published as WO 2017/187040 on Nov. 2, 2017, not in English.

2. FIELD OF THE INVENTION

The field of the invention is that of signal compression, in particular of a digital image or a sequence of digital images, divided into blocks of pixels.

The invention more particularly relates to the transformation of a block of pixels, originating from a prediction or not. It finds particular application in a transform competition context.

The coding/decoding of digital images applies in particular to images from at least one video sequence comprising:
 images from the same camera and succeeding one another temporally (2D-type encoding/decoding),
 images from different cameras oriented according to different views (3D-type encoding/decoding),
 corresponding texture and depth components (3D type encoding/decoding),
 etc.

The present invention applies similarly to the encoding/decoding of 2D or 3D type images.

The invention may especially, but not exclusively, apply to video coding implemented in current AVC video coders (for "Advanced Video Coding") and HEVC (for "High Efficiency Video Coding") and their extensions (MVC, 3D-AVC, MV-HEVC, 3D-HEVC, post-HEVC, etc.), and the corresponding decoding.

3. DESCRIPTION OF THE RELATED ART

We consider a conventional compression scheme of a digital image, according to which the image is divided into blocks of pixels. A current block to be coded, which constitutes an initial coding unit, is generally divided into a variable number of sub-blocks according to a predetermined cutting mode. In relation to FIG. 1, a sequence of digital images $I_1, I_2, I_J$, with a non-zero integer J is considered. An image is split into initial coding units or CTUs (for "Coding Tree Units") according to the HEVC terminology, as specified in "ISO/IEC 23008-2:2013—High efficiency coding and media delivery in heterogeneous environments—Part 2: High efficiency video coding», International Organization for Standardization, published in November 2013. The standard coders typically offer regular partitioning, based on square or rectangular blocks, so-called CU (for "Coding Units") of fixed size. Partitioning is always performed from the initial, unpartitioned coding unit, and the final partitioning is calculated and reported from this neutral base.

Each CU undergoes an encoding or decoding operation consisting of a sequence of operations, including in a non-exhaustive manner a prediction, a residue calculation, a transformation, a quantisation and an entropy coding. This sequence of operations is known from the prior art and presented in relation to FIG. 3.

During a step E0, the first block CTU to be processed is selected as the current block c. For example, this is the first block (in lexicographic order). The size of this block is for example 64×64 according to the HEVC standard.

It is assumed that there are D partitions in possible CUs numbered from 1 to D, with D a non-zero integer and that the partitioning used on block c corresponds to the partitioning number d. For example, there can be 4 possible sizes of square partitioning in sub-blocks of size 4×4, 8×8, 16×16, and 32×32 according to a regular cutting mode of type "quad tree" as specified in the HEVC standard. Partitioning into rectangular sub-blocks is also possible.

In the following, we denote by current block a sub-block P from the partitioning of the CTU block c. The steps that will be described are repeated for the other sub-blocks. During a step E1, a prediction Pr of the block CU P is determined. It is a prediction block constructed by known means, typically by motion compensation (block from a previously decoded reference image), or by intra prediction (block constructed from decoded pixels belonging to the image ID). The prediction information related to Pr is coded in the bit stream TB or compressed file FC. We assume here that there are P possible prediction modes $m_1, m_2, \ldots, m_p$, with P a non-zero integer. For example, the prediction mode chosen for the current block x is the mode $m_p$. Some prediction modes are associated with an Intra type prediction, others with an INTER type prediction.

During a step E2, an original residue R is formed by subtracting R=P−Pr from the prediction Pr of the current block P, at the current frame P.

In E3, we identify a transform T to apply to the residue R or to a sub-block derived from a subdivision of R.

The transformation step plays a crucial role in such a video coding scheme: indeed, this step concentrates the information before the quantisation operation. As a result, a set of pixels before coding is shown on a small number of non-zero frequency coefficients representing the same information. Thus, instead of transmitting a large number of coefficients, only a small number will be needed to faithfully reconstruct a block of pixels.

This transformation step is complex to implement both coder side and decoder side, which must implement the inverse transformation of that applied by the coder.

During a step E4, the residue R is transformed into a transformed residue block, so-called RT, by the identified transform. Alternatively, in the absence of prediction, a transformed block RT is obtained from the block c. This is for example a block-type transform or a wavelet transform, all known to those skilled in the art and in particular implemented in the JPEG/MPEG standards for the DCT/DST and JPEG2000 for the wavelet transform.

In image and video coding, orthogonal or quasi-orthogonal block transforms (4×4, 8×8, etc.) are generally used. The most used transforms are based on cosines or sines. They are usually referred to as DTT (for "Discrete Trigonometric Transforms"). The DCT is thus present in most standards for image and video. Recently the HEVC standard has also introduced the DST (for "Discrete Sine Transform") for the coding of particular residues in the case of 4×4 blocks.

In fact, approximations of these transforms are used, the calculations being carried out on integers. In general, the bases of transforms are approximated to the nearest integer, after multiplication by a factor which conditions the precision given to the approximation (this factor is often at the power of 2 generally of 8 or 10 bits).

As an example, transforms used by the HEVC standard on 4×4 block size are presented in connection with FIGS. 2A and 2B: these are the DCT and DST transforms. The values presented in this table are to be divided by 128 to find the quasi-orthonormal transformations.

In E5, in a manner known in the state of the art, these coefficients are traversed in a predetermined order so as to constitute a one-dimensional vector RQ[j], where the index j varies from 0 to Nb−1, with Nb an integer equal to the number of pixels in the block x. The index j is called the frequency of the coefficient RQ[j]. Classically, these coefficients are scanned by globally increasing or decreasing order of frequency values, for example according to a predetermined path, for example diagonal or horizontal.

In E6, the transformed block RT is quantised by conventional quantisation means, for example scalar or vector, into a quantised block RQ comprising as many coefficients Nb as the block RT.

During a step E7, the information relating to the coefficients of the block RQ is coded by entropy coding, for example according to a Huffman coding or arithmetic coding technique. This information includes at least the amplitude of the coefficients and their sign. By amplitude, here is meant the absolute value of the coefficient. Conventionally, a piece of information representative of the fact that the coefficient is non-zero, can be coded for each coefficient. Then, for each non-zero coefficient, one or more pieces of information relating to the amplitude are coded. Coded amplitudes CA are obtained. The signs of non-zero coefficients are also coded. In general, they are simply coded by a bit 0 or 1, each value corresponding to a given polarity. Such coding provides efficient performances because, due to the transformation, the values of the amplitudes to be coded are mostly equal to zero.

Concerning the applied transform, in the case of the HEVC standard, the decoder is indicated by a bit, so-called "transform_skip_flag", the inverse transform to be applied among the two alternatives DST or absence of transform. This case occurs in the case of 4×4 size blocks.

In E8, the coded data relating to the current block x are inserted in the bit stream TB.

The other sub-blocks which constitute the block R of the image I1 are processed in the same way, then the other blocks CTU of the image I1, as well as the blocks of the following images of the sequence.

The step of transforming a current block into a transformed block generates complex calculations, which the person having skills in the art has attempted to simplify and/or accelerate.

This complexity increases with the size of the processed blocks. In HEVC, the transforms can reach a size of 32×32.

We especially know from the paper of Markus Püschel entitled *Algebraic Signal Processing Theory: Cooley-Tukey Type Algorithms for DCTs and DSTs*, published in IEEE Transactions on Signal Processing, in April 2008, a methodology for rapid implementation of the families of DCT or DST transformations. This method relates in particular to trigonometric DCT and DST transforms of types I to VIII and it is shown that fast algorithms for very particular sizes (typically to the power of 2 or close to a power of two) can be implemented.

A disadvantage of these types of DCT or DST transforms is that all of them are not applicable to all block sizes, especially among those specified in the HEVC standard. For example, the DST as specified in HEVC is limited to 4×4 block sizes because it induces significant complexity for larger sizes.

Another disadvantage is that some transforms do not have fast algorithms.

4. SUMMARY OF THE INVENTION

These objectives, as well as others that will appear later, are achieved by means of a method for decoding at least one digital image, from a bit stream comprising coded data representative of said image, said image being divided into a plurality of blocks processed in a defined order, said method comprising the following steps, implemented for a block, so-called transformed current block:
  decoding the current block coefficients from coded data read in the bit stream;
  transforming the current block into a decoded block, said step implementing a first substep intended to produce an intermediate block, that applies to the column vectors respectively row vectors of the current block, the second step intended to produce a block of pixels that applies to the row vectors respectively column vectors of the intermediate block, resulting from the first substep; and
  rebuilding the image from the transformed decoded block.

Such a method is particular in that at least one of said first and second transformation substeps comprises, for a row vector respectively a column vector, said an input vector:
  forming a first subvector of size K<N respectively M from adjacent elements of the input vector and at least one second subvector of size equal to N−K or M−K respectively from adjacent elements of the input vector, not included in the first subvector, such that the sum of the sizes of the subvectors formed is equal to the size of the input vector.
  transforming the first subvector into a first transformed subvector by applying a first partial subtransform of size K×K and transforming the second subvector into a second transformed subvector by applying a second subtransform of size (N−K)×(N−K); and
  building a transformed input vector of the intermediate block for the first transformation substep, respectively of the transformed decoded block for the second transformation step, by inserting the first transformed subvector and the at least one second transformed subvector.

We consider a separable transformation implemented from two orthogonal or quasi-orthogonal transforms.

The invention is based on an entirely new and inventive approach, whereby at least one of the orthogonal transformation substeps is replaced with at least two partial transformations of the row vectors or column vectors of the block to be transformed. Each partial transformation applies to a subvector of the row vector or column vector to be processed and is the only transformation applied to its elements, since the coefficients resulting from this transformation are directly placed back into an output vector intended for the next subtransformation step. There is therefore no recombination of the values obtained with other data resulting from a transformation of other elements of the input vector.

According to the invention, the sum of the sizes of the formed subvectors is equal to the size of the input vector, and the composition of the transformed vector comprises the insertion of elements of the first and of the at least one transformed second subvector to the initial positions of the first subvector and of the at least a second subvector formed in the input vector.

Thus, all elements of the input vectors, i.e. row or column vectors, are each processed by one and only one subtransform. As proved later in the description, breaking down into partial subtransformations proposed by the invention leads to a number of operations less than or equal to that necessary to apply a single transform of size equal to that of the input vectors.

According to another aspect of the invention, the first and second subtransforms are of different types.

In a context of transform competition, the coder selects, for the current block, the transforms which provide the best rate-distortion compromise. When an association of partial subprocesses according to the invention is chosen for at least one of the first or second substeps, the resulting gain in coding complexity is added to the gain in compression.

According to another aspect of the invention, one of the at least two partial sub-transforms is an identity transform.

As a result, at least one subset of the pixels/coefficients of the vectors (rows or columns) is not transformed during the transformation substep, which has the effect of reducing the complexity of the overall transformation.

According to yet another aspect of the invention, the size of at least one of the subvectors of the input vector is odd in number.

One advantage is that it can be applied a partial subtransform of odd size, for which there is a fast algorithm. This is the case, for example, of DTT type or DCT I type transforms.

The method which has just been described in its various embodiments is advantageously implemented by a device for decoding a digital image, from a bit stream comprising coded data representative of said image, said image being divided into a plurality of blocks processed in a defined order, said device comprising the following units, capable of being implemented for a block, so-called transformed current block:

decoding the coefficients of the current block from coded data read in the bit stream;

transforming the current block transformed into a decoded block, said transforming unit being capable of implementing a first transformation sub-unit capable of producing an intermediate block, that applies to the column vectors respectively row vectors of the current block, a second transformation sub-unit capable of producing a block of pixels that applies to the row vectors respectively column vectors of the intermediate block, resulting from the first sub-unit; and rebuilding the image from the transformed decoded block.

Such a device is particular in that at least one of said first and second transformation sub-units comprises, for a so-called row vector respectively a column vector, said an input vector:

forming a first subvector of size K<N respectively M from adjacent elements of the input vector and at least one second subvector of size equal to N−K respectively M−K respectively from adjacent elements of the input vector, not included in the first sub-vector, such that the sum of the sizes of the formed subvectors is equal to the size of the input vector;

transforming the first subvector into a first transformed subvector by applying a first partial subtransform of size K×K and transforming the second subvector into a second transformed subvector by applying a second subtransform of size (N−K)×(N−K); and building a transformed input vector of the intermediate block for the first transformation substep, respectively of the decoded block transformed for the second transformation step, by inserting the first transformed subvector and the at least one second transformed subvector.

Correlatively, the invention also relates to a method for coding a digital image, said image being divided into a plurality of blocks of pixels processed in a defined order, said method comprising the following steps, implemented for a current block of predetermined dimensions:

transforming the current block into a transformed block, said current block comprising M row vectors and N column vectors, with M and N non-zero integers, said step comprising a first substep of transformation of the M row vectors, respectively column vectors, intended to provide an intermediate block formed from the row vectors, respectively column vectors respectively transformed and a second substep of transformation of the M column vectors, respectively row vectors of the intermediate block;

coding the transformed block intended for producing coded data representative of the transformed block;

inserting the coded data into a bitstream representative of the coded image.

According to the invention, such a method is particular in that at least one of said first and second transformation substeps comprises, for a row vector respectively a column vector, so-called input vector:

forming a first subvector of size K<N respectively M from adjacent elements of the input vector and at least one second subvector of size equal to N−K respectively equal to M−K from adjacent elements of the input vector, not included in the first sub-vector, such that the sum of the sizes of the formed subvectors is equal to the size of the input vector;

transforming the first subvector into a first transformed subvector by applying a first partial subtransform of size K×K and transforming the second subvector into a second transformed subvector by applying a second subtransform of size (N−K)×(N−K); and building a transformed vector of the intermediate block for the first transformation substep, respectively of the transformed decoded block for the second transformation step, by insertion of the first transformed subvector and the at least one second transformed subvector.

The method for coding a digital image according to the invention performs the inverse transformation step of the one implemented by the method for decoding a digital image which has just been described with its different embodiments.

The coding method according to the invention is implemented advantageously by a device for coding a digital image, said image being divided into a plurality of blocks of pixels processed in a defined order, said device comprising the following units, capable of being implemented for a current block (x) of predetermined dimensions:

transforming the current block into a transformed block, said current block comprising M row vectors and N column vectors, with M and N non-zero integers, said transformer comprising a first sub-unit of transformation of the M row vectors, respectively column vectors, intended to provide an intermediate block formed from the row vectors, respectively column vectors, transformed, and a second substep of transformation of the M column vectors, respectively row vectors of the intermediate block;

encoding the transformed block intended for producing coded data representative of the transformed block;

building a bit stream representative of the coded image adapted to insert said coded data in the bit stream.

Such a device is particular in that at least one of said first and second transformation sub-units comprises, for a so-called row vector respectively a column vector, said an input vector:

forming a first subvector of size K<N respectively M from adjacent elements of the input vector and at least one second subvector of size equal to N–K respectively M–K respectively from adjacent elements of the input vector, not included in the first sub-vector, such that the sum of the sizes of the formed subvectors is equal to the size of the input vector;

transforming the first subvector into a first transformed subvector by applying a first partial subtransform of size K×K and transforming the second subvector into a second transformed subvector by applying a second subtransform of size (N–K)×(N–K); and building a transformed input vector of the intermediate block for the first transformation substep, respectively of the decoded block transformed for the second transformation step, by inserting the first transformed subvector and the at least one second transformed subvector.

The invention also relates to a signal carrying a bit stream comprising coded data representative of a digital image, said digital image being divided into blocks of processed pixels in a defined order, a transformed block being obtained by transforming the pixels of a current block, said transformation comprising a first substep intended to produce an intermediate block, that applies to the row vectors respectively column vectors of the current block, the second intended to produce a block of pixels applied to the column vectors respectively row vectors of the intermediate block, resulting from the first substep.

Such a signal is particular in that, at least one of said first and second transformation substeps comprises forming a first subvector of size K<N respectively N from adjacent elements of the row vector respectively column vector and at least one second subvector of size equal to N–K respectively M–K respectively from adjacent elements of the input vector, not included in the first sub-vector, such that the sum of the sizes of the formed subvectors is equal to the size of the input vector, the application of a partial subtransform of size K×K to said sub-vector and applying a second size subtransform (N–K)×(N–K) to said second sub-vector, and the building of a row vector respectively column vector transformed by inserting the first transformed subvector and the at least one second transformed subvector, said signal comprises an identifier representative of said partial subtransform.

The invention further relates to a user terminal characterised in that it comprises the device for coding a digital image and the device for decoding a digital image which have just been described.

The invention also relates to a computer program comprising instructions for implementing the steps of a method for decoding a digital image as described above, when this program is executed by a processor.

The invention also relates to a computer program comprising instructions for implementing the steps of a method for coding a digital image as described above, when this program is executed by a processor.

These programs can use any programming language. They can be downloaded from a communication network and/or recorded on a computer-readable medium.

The invention finally relates to recording media, which are readable by a processor, whether or not integrated into the device for coding a digital image and to the device for decoding a digital image according to the invention, which might be removable, respectively storing a computer program implementing a coding method and a computer program implementing a decoding method, as described above.

5. LIST OF FIGURES

Figure 3:
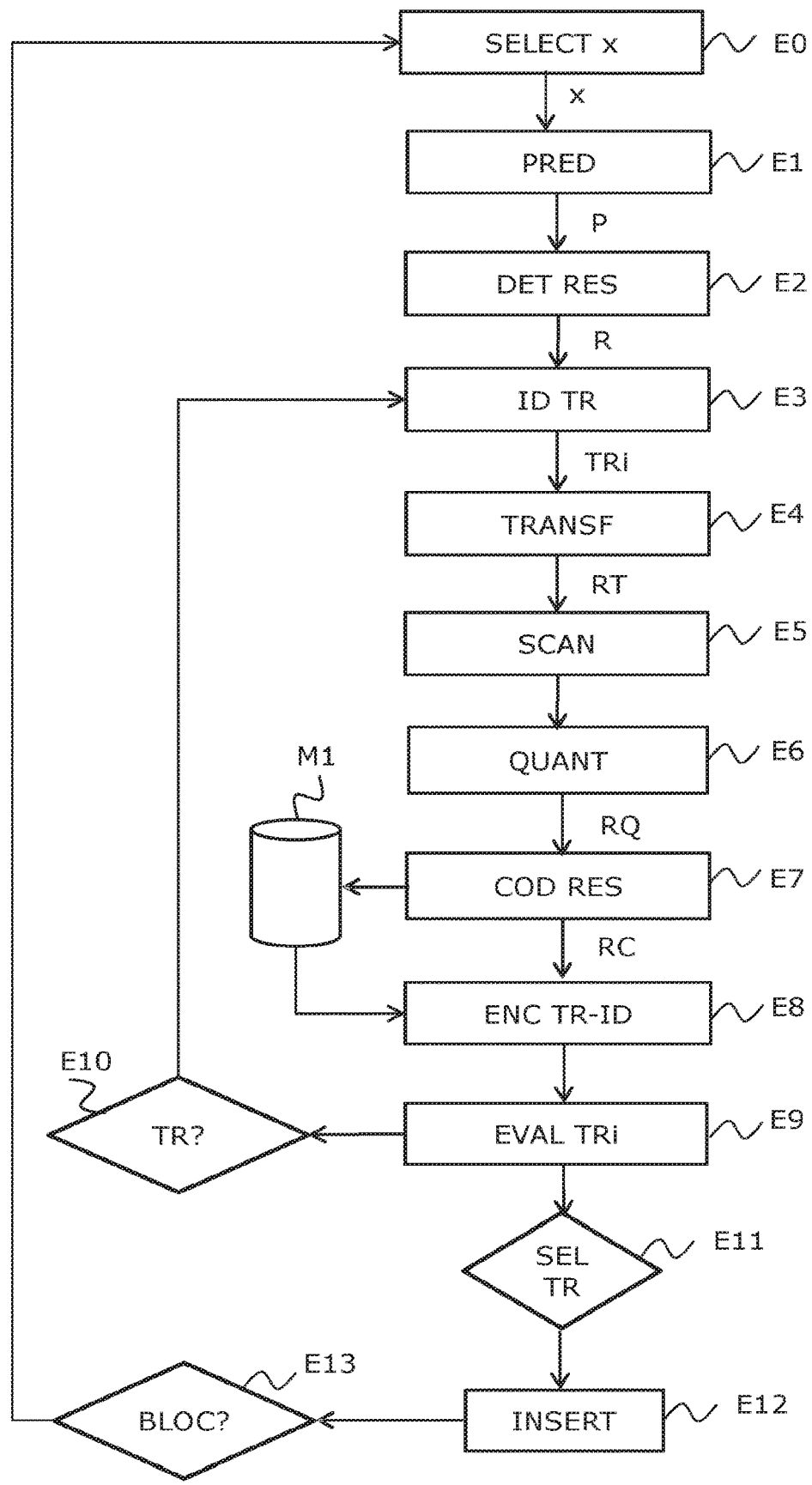
Figure 4:
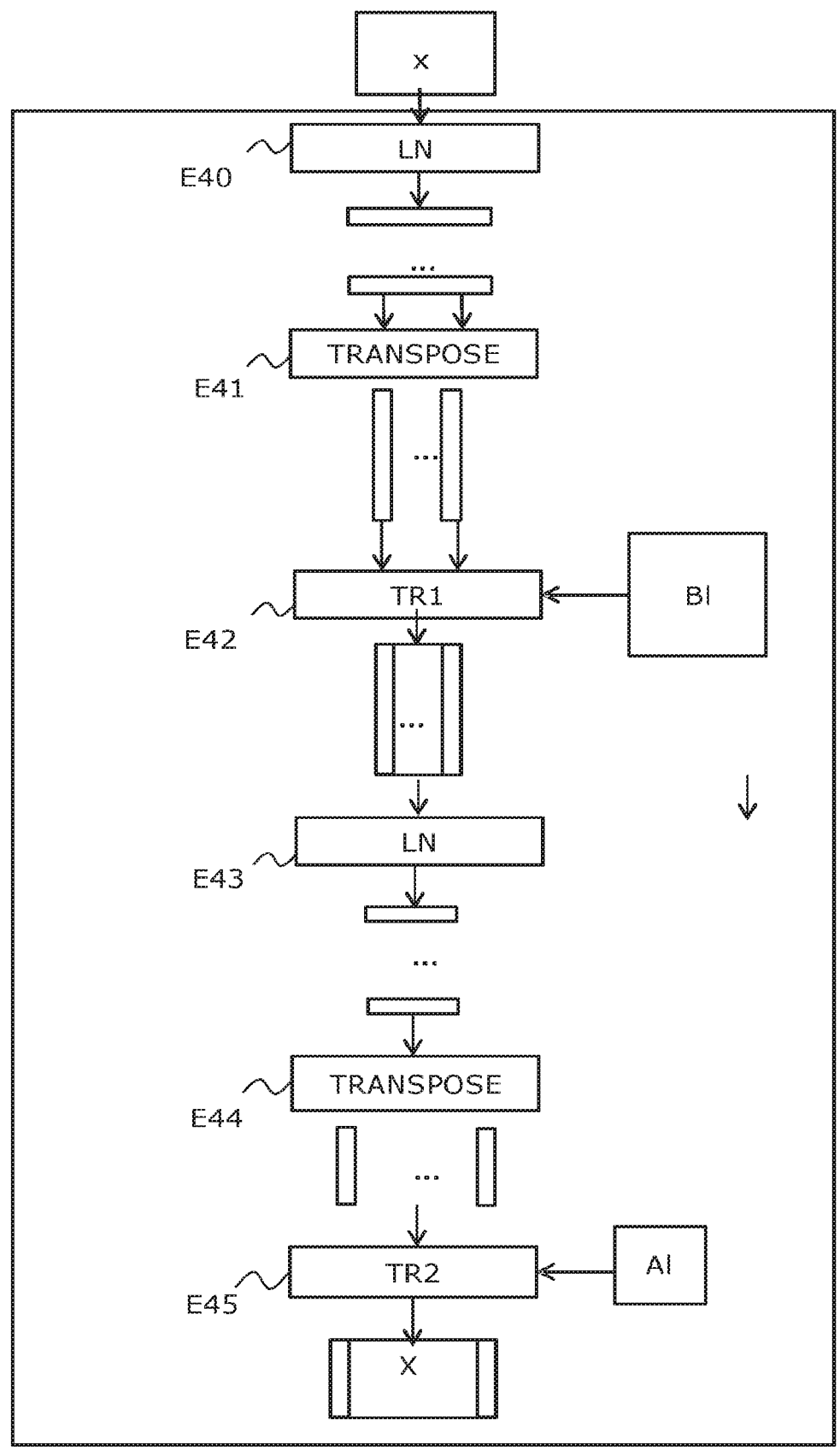
Figures 5, 6A, 6B, 6C:
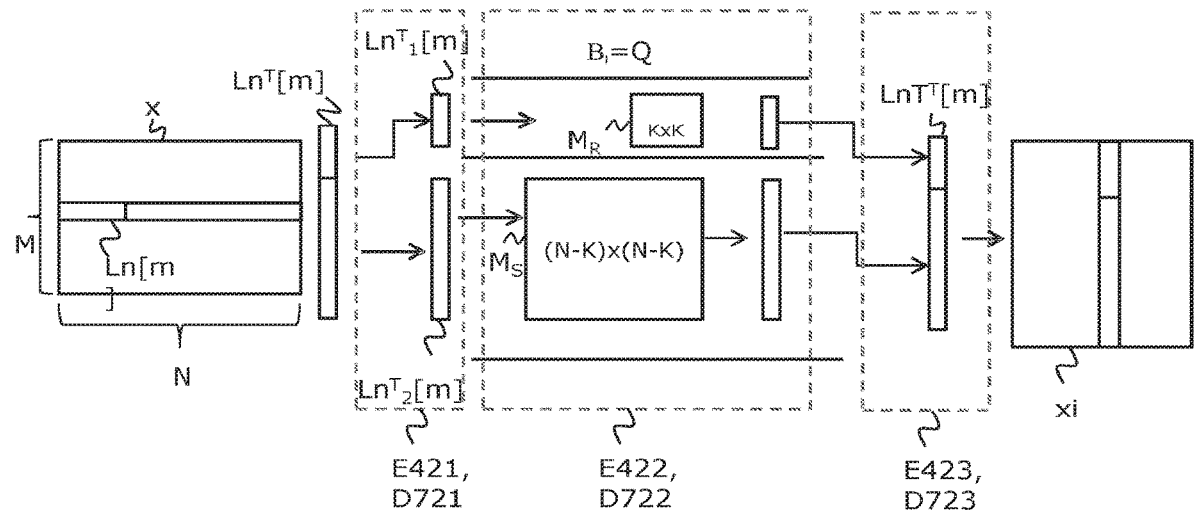

Other features and advantages of the invention will appear more clearly on reading the following description of an embodiment of the invention, given as a simple illustrative and non-limiting example, and the appended drawings among which:

FIG. 1 (already described) schematically shows a sequence of digital images cut into blocks of pixels;

FIGS. 2 A and 2 B (already described) present the size 4 type DCT and DST transforms implemented by the HEVC standard encoder;

FIG. 3 (already described) schematically shows the steps of a method for encoding a digital image according to the prior art;

FIG. 4 presents in more detail the transformation step of a current block of a digital image according to the prior art;

FIG. 5 schematically shows an example of a substep of transforming the row or column vectors of a block according to an embodiment of the invention.

Figure 7:
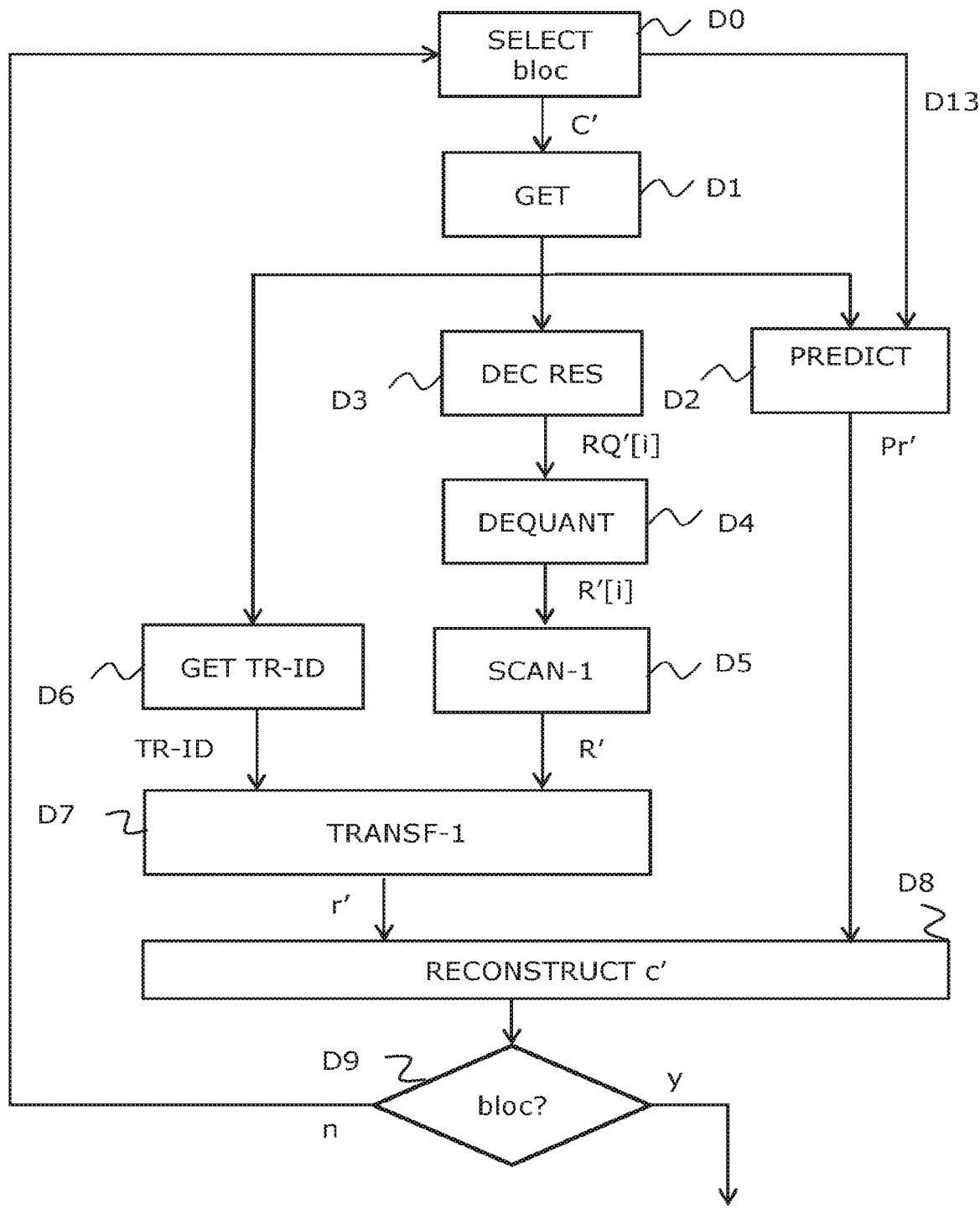
Figure 8:
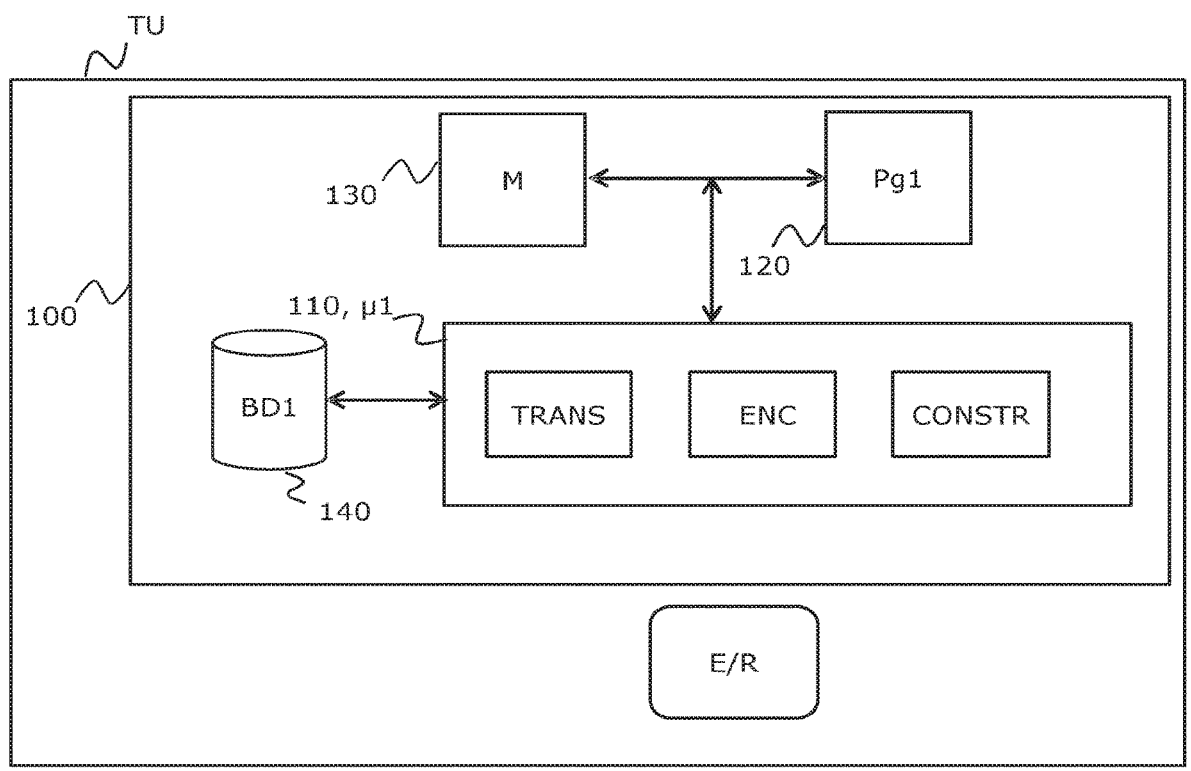
Figure 9:
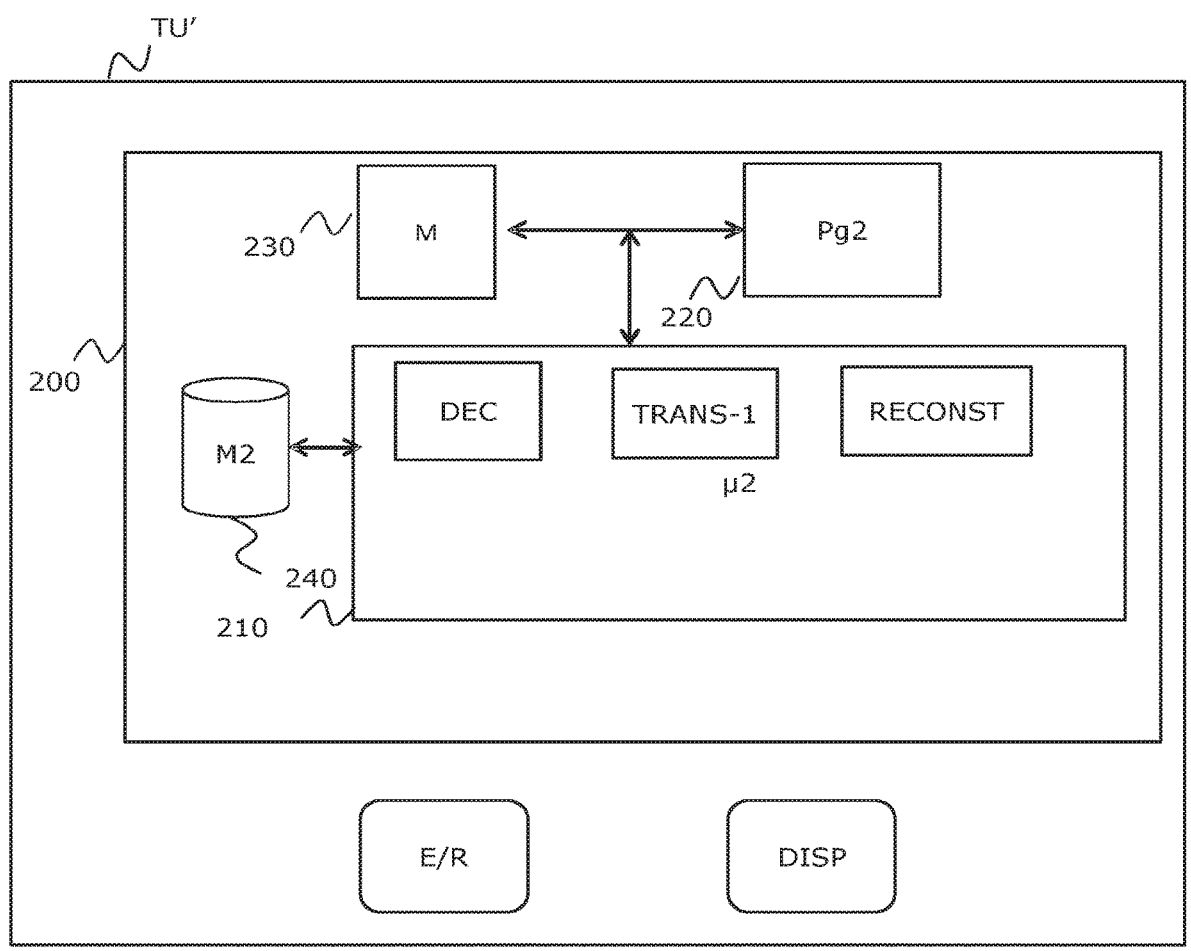

FIGS. 6A at 6C show examples of partial subtransforms according to the invention;

FIG. 7 schematically shows the steps of a method for decoding a digital image;

FIG. 8 schematically shows the hardware structure of a device for coding a digital image according to the invention; and FIG. 9 schematically shows the hardware structure of a device for decoding a digital image according to the invention.

6. DESCRIPTION OF A PARTICULAR EMBODIMENT OF THE INVENTION

In the remainder of the description, the framework of a coding scheme of a digital image has been chosen, for example as previously described in relation with FIG. 3.

Note however that the prediction step of a current block E1 previously described is optional and that the next step E4 of transformation can therefore be applied directly to the pixels of the current block.

Let us consider a rectangular current block of size N×M (N columns, M rows), with N and M non-zero integers and at least one transform $T_l$ to be applied to this block. The transform $T_l$ belongs to a set of L transforms $\{T_0, T_1, \ldots T_l, \ldots, T_{L-1}\}$, with L a non-zero integer.

In relation to FIG. 4, an exemplary embodiment of a transformation of a block x of pixels using a transform $T_l$ is detailed. Let us consider, in a manner known to those skilled in the art, that the application of this transform $T_l$ can be broken down into two successive transformation substeps by transforms $B_l$ and $A_l$, which will now be presented.

In E40, the M row vectors Ln[m] of size N are extracted from the current block x, with m an integer between 0 and M–1. In E41, the M vectors Ln[m] are transposed to be presented as column vectors of size N. In E42, they are transformed by a first transform $B_1$ of size N×N. An intermediate block of size M×N is obtained. In E43, N column vectors of size M are extracted and then transposed into E44. The transposed vectors Col[n] with n between 0 and N–1 are transformed into E45 by a second transform $A_l$ of size M×M.

Thus $A_I$ and $B_I$ can operate as follows:

$$X_I = A_I (B_I \cdot x^t)^t \quad (1)$$

$A_I$ and $B_I$ are transforms that can express themselves in the form of square matrices (respectively of size M×M and N×N) and which are respectively adapted to transform each constituent vector of the pixel block s. $X_I$ is the block of coefficients resulting from the transformation of the block x by the transform $T_I$.

$X_I$ can also be expressed in other equivalent forms, for example by omitting the transposition of the block x. In this case we perform the calculation:

$$X_I = B_I (A_I \cdot x)^t \quad (2)$$

In this case, the N column vectors are transformed at first with a size M of transformation, followed by transformation on the resulting rows by M transforms of size N.

In known manner, transforms are typically applied to row/column vectors of sizes equal to powers of 2. For example, the HEVC standard transforms row/column vectors of sizes 4, 8, 16 or 32.

It is assumed here that the first and second transforms $A_I$, $B_I$ are orthogonal or quasi-orthogonal transforms. Such transformations have a property that a transformation matrix multiplied by its transpose only exhibits the constant non-zero diagonal terms. In the quasi-orthogonal case, the terms outside the diagonal have negligible values with respect to the amplitude of the diagonal terms. So the inverse of an orthogonal matrix is approximated by its transpose within one factor, so that at decoding, the transpose of the matrix used in the coding can be applied.

It will be noted that the transforms $A_I$ and $B_I$ and can also be applied through a rapid implementation by an algorithm that represents the form of a diagram composed of butterflies (that is to say, linear combinations of terms taken in pairs). This applies to all trigonometric transformations, as described in the article by Markus Püschel already cited.

One known way to appreciate the computational complexity of such a transformation step is to count the number of addition and multiplication operations required. Table 1 below gives some examples of computational complexity estimates made using this method.

There are the "general case" in which a transformation is applied in matrix form and particular cases (DCT I, DCT II) that rely on fast implementations of transformations under Article Markus Püschel cited above. The number of operations reported relates to the processing of a pixel vector.

TABLE 1

| Type of transform | Number of multiplications | Number of additions | Total of operations | Operations/ pixel |
|---|---|---|---|---|
| General case size 3 | 9 | 6 | 15 | 5 |
| General case size 4 | 16 | 12 | 28 | 7 |
| General case size 8 | 64 | 56 | 120 | 15 |
| DCT I size 3 | 2 | 4 | 6 | 2 |
| DCT I size 4 | 4 | 8 | 12 | 3 |
| DCT II size 3 | 4 | 4 | 8 | 2.67 |
| DCT II size 4 | 4 | 8 | 12 | 3 |
| DCT II size 7 | 8 | 30 | 38 | 5.43 |
| DCT II size 8 | 14 | 26 | 40 | 5 |
| DCT I size 3 | 0 | 4 | 4 | 1.33 |
| DCT I size 4 | 8 | 8 | 16 | 4 |

A transformation matrix comprising N rows and N columns is now considered. In the general case, we have N multiplications and N−1 additions for each row of the matrix. As a result, we have N*N and N*(N−1) multiplications and additions in total. We then have a number of operations per transformed value of 2N−1.

It is noted that the complexity increases significantly with the size of the block to be processed. We also note that there are so-called fast transforms, which are more economical in computing resources.

In the case of quasi-orthogonal transforms, the inverse transformation being the same as applying the transformation with transposed coefficients, the computational complexity for the inverse is identical to the direct transformation.

In relation to FIG. 5, the transformation step E4 according to one embodiment of the invention will now be detailed. The invention proposes modifying at least one of the sub-transformation steps E42 of the columns, respectively of the rows E45 of the current block. More precisely, it proposes to replace the application of the subprocess $A_I$ or $B_I$ with the application of at least one partial subtransform to a subvector of a column or row vector. The subvector obtained is replaced in the vector column or output row to form the vector transformed by step E42 or E45. It is not recombined with other data from other potential transformations of the column vector or input row.

In a known manner, the first step E42 of subtransformation by the transform $B_I$ can be carried out using a matrix Q of size N×N.

In the particular example in FIG. 5 and according to the invention, the first step E42 of subtransformation by the transform $B_I$ is carried out using two partial subtransforms R and S.

For example, the step of transformation of the M transposed row vectors of size N $Ln^T[m]$ by the particular subtransform $B_I$ of size N×N is performed by applying a first subtransform R of size K×K to a subset of the pixels of the column vectors of the block and of a second subtransform S of size (N−K)×(N−K) to the rest of the pixels of the column vectors of this block. All the elements of a vector are thus processed only once by only one of the two subpartial transforms.

From a mathematical point of view, the transform $B_I$ can then be expressed in the form of a matrix $M_{BI}$ comprising in its diagonal a submatrix $M_R$ of size K×K corresponding to the first subtransform R and a submatrix $M_S$ of size (N−K)×(N−K) corresponding to the second subtransform S, the rest of the elements of the matrix $M_{BI}$ is zero, as shown in FIG. 6 A.

Thus, according to this embodiment of the invention, to transform a vector with the matrix $M_{BI}$, it is sufficient to perform a transformation by the matrix $M_R$, which processes the first K values of a vector $Ln^T[m]$ and a transformation by the matrix $M_S$ which covers the remaining N−K pixels of this vector.

In relation with FIG. 5, the transformation substep of an m-th transposed row vector $Ln^T[m]$ of the block x to be transformed by the two partial subtransforms R and S according to the invention is detailed. A first subvector $Ln^T_1[m]$ of size K is formed in E421 from the K first elements of the vector Vm and a second subvector $Ln^T_2[m]$ of size N−K is formed from the remaining N−K elements of the vector $Ln^T[m]$. In E422, each subvector is transformed by the matrix $M_R$, respectively $M_S$, corresponding to the partial subtransform R, respectively S. The transformed subvectors S $LnT^T_1[m]$ and $LnT^T_2[m]$ m are returned in E423 to the initial positions of the elements of the subvectors $Ln^T[m]$ and $Ln^T[m]$ in the transformed vector $Ln^T[m]$.

These operations are repeated for the M transposed row vectors of the block to be transformed. The M transformed vectors are returned to their initial positions to form the intermediate block BI.

We will now show that splitting the matrix $M_{BI}$, into one part $M_R$ processing K points and into one part $M_S$ processing N–K points (with K<N–K, without loss of generality), generates a reduction in complexity.

For a transformation of size N, applied in matrix form: we have N*N multiplications and N*(N–1) additions.

For a transformation of size K, applied in matrix form: we have K*K multiplications and K*(K–1) additions.

For a transformation of size N–K, applied in matrix form: we have (N–K)*(N–K) multiplications and (N–K)*(N–K–1) additions.

If we cumulate the computations associated with the transformations N–K and K, we count:
1. K*K+(N–K)*(N–K) multiplications
2. K*(K–1)+(N–K)*(N–K–1) additions
1. gives N*N+2*K*(K–N), where K<N so 2*K*(K–N) is negative, so the quantity is less than N*N which is the number of multiplications for size N
2. similarly, it is shown that the number of additions is lower than for size N.

It will be noted that in the particular case of a type II DCT (refer to Table 1 above), Q is of size 8 and requires 40 operations in total, whereas the implementation of the transform of the partial transform of size 7 involves only 38 operations.

In the particular case of type 1 DCT of size 3 and 4 it is understood that it is notoriously more favourable to process a size 3 transform which requires 6 operations to be compared to the 12 operations required by size 4.

In a first particular example, N=8, K=4 and the complexity is evaluated if R and S are chosen as DCT II type transformations, for which a fast algorithm is available.

The computational complexity is then 12+12=24 operations for the 8 pixels constituting the vector, i.e. 3 operations per pixel. This is to be compared to a DCT II size 8 transform, which requires 5 operations per pixel.

In a second particular example, N=8, K=4 and the complexity is evaluated if R and S are chosen as transformations implemented in the form of a matrix product without any available fast algorithm.

The computational complexity is then 28+28=56 operations for the 8 pixels constituting the vector, i.e. 7 operations per pixel. This is to be compared to a size 8 transform, which requires 15 operations per pixel.

In a third particular example, N=8, K=4 and the complexity is evaluated if R is selected as a Type II DCT and S as an applied transform as a matrix product. This makes it possible to apply a suitable transformation to a part of the vectors of the block, whereas this adapted transform can for example be of the RDOT type as described in the O. Sezer article already cited.

The computational complexity is then 12+28=40 operations for the 8 pixels constituting the vector, i.e. 5 operations per pixel. This should be compared with a size 8 transform applied as a matrix product that requires 15 operations per pixel.

As a result, the invention notoriously reduces computational complexity. In the two cases presented above, 3/5=60% and 7/15=47% and 5/15=33% respectively of the complexity of a full size transformation are used.

According to a second embodiment of the invention, the first subtransform of size K×K is an identity-type transformation. It is expressed as a matrix containing only identical terms on its diagonal. The matrix $M_{BI}$ corresponding is shown on FIG. 6B for a 4×4 size block.

By way of illustration, the identity transforms $I_3$ of size 3×3, $I_2$ of size 2×2 and $I_1$ of size 1 are presented below:

$$I_3 = \begin{bmatrix} 1 & 0 & 0 \\ 0 & 1 & 0 \\ 0 & 0 & 1 \end{bmatrix}, I_2 = \begin{bmatrix} 1 & 0 \\ 0 & 1 \end{bmatrix}, I_1 = [1]$$

In FIG. 6C, another example of matrix $M_{BI}$ is schematised, a first identity subtransform $I_2$ followed by a second subtransform of size 2×2.

In both cases, the application of the subtransform $R=I_1$ respectively $I_2$ requires no calculation in this particular case, so the application of the matrix $M_{BI}$ has the same complexity as the matrix MS.

Three cases are presented with R=I1 and S respectively taking the form of a matrix of size N–K=3, a DCT-II of size N–K=3 and a DCT-II of size N–K=7.

TABLE 2

| Type of transform | Number of multiplications | Number of additions | Total of operations | Operations per pixel |
| --- | --- | --- | --- | --- |
| N = 4, K = 1, S general case matrix | 9 | 6 | 15 | 3.75 |
| N = 4, K = 1, S is DCT II of size N – K = 3 | 4 | 4 | 8 | 2 |
| N = 8, K = 1, S is a DCT_II of size N – K = 7 | 8 | 30 | 38 | 4.75 |

Table 2 shows that with this embodiment, the complexity ratio is therefore 15/28=53% (28 corresponds to the complexity due to a 4×4 matrix of any type) and 8/12=67% (12 corresponds to the case where there is a fast DCT II transform of size 4) and 38/40=95% of the initial complexity.

The first embodiment therefore allows a higher gain complexity in the latter mode.

We shall now describe a third embodiment of the invention which relates to a transform competition context. In connection with FIG. 3, the coding method identifies at E3 a transform to apply to the current block among a plurality of predetermined transforms and, following the coding steps E4 to E8 of the current block using the identified transform, it stores the coded data in a memory M1. It then repeats the coding steps E3 to E8 of the current block with other transforms of the list. In E9, the best transform is selected, based on a rate-distortion criterion.

We know from the article by Arrufat et al, entitled "Low Complexity Transform Competition for HEVC" published in the Proceedings of the ICASSP of March 2016, a selection method of a select group of transforms from a list of several "complete" transforms of separable type, optimised for distortion or based on discrete trigonometric transformations, so-called DTT, to which the DCT and DST transforms belong.

In a first step, according to the prior art, the compression performance of a coder with complete transformations, that is to say of sizes equal to those of the processed block, is assessed. To do this, we have a set of 16 types of trigonometric transforms of size 4, for example those for which we have a fast implementation as described in the Püschel article already cited.

For example, the list of the following transforms (8 types of DCT and 8 types of DST) is assessed: DCT I, DCT-II, DCT-III, DCT-IV, DCT-V, DCT-VI, DCT-VII, DCT-VIII, DST-I, DST-II, DST-III, DST-IV, DST-V, DST-VI, DST-VII, DST-VIII.

In total there are therefore 16×16=256 possible combinations when combining the vertical ($B_l$) and horizontal ($A_l$) transforms.

To assess these different combinations of transforms, for each pair, a compactness in a distortion/parcimony plane, as described in the article by Sezer already cited, is measured on a set of residual image signals the following quantity:

$$J(\lambda) = \frac{1}{HNM} \sum_l \sum_{i \in TestSet} \|x_i - T_l^t \widetilde{X_{l,i}}\|^2 + \lambda \|\widetilde{X_{l,i}}\|_0 = \quad (3)$$

$$\sum_l \sum_{i \in TestSet} Dist + \lambda Rate$$

$x_i$ are the residual blocks collected on a large set of various images. In this particular case, they are derived from 4×4 block size for intra prediction angular index 26 according to the HEVC standard.

$\widetilde{X_{l,i}}$ are the residual blocks quantised by thresholding resulting from the transformation of $x_i$ by $T_l$ composed of $A_l$ and $B_l$.

$\|\cdot\|_0$ represents the zero norm, that is the number of non-zero coefficients in $\widetilde{X_{l,i}}$.

N,M are the dimensions of the block and H is the number of blocks considered.

$\lambda$ is a Lagrange multiplier that allows to set the constraint on the number of non-zero coefficients in $\widetilde{X_{l,i}}$, according to the Sezer publication cited above.

For example, the best transformations $A_l$, $B_l$, i.e., those producing the 5 weakest measures $j(\lambda)$ are chosen. By learning, in accordance with the publication of Arrufat, the most effective five pairs of transforms are selected to code a set of residual blocks from a vertical prediction. In this example, at the end of the learning phase, the set of the 5 best pairs of transforms is that of table 3:

TABLE 3

| AI | BI |
|---|---|
| DST_VII | DST_VII |
| DST_IV | DCT_III |
| DCT_VI | DCT_I |
| DCT_V | DCT_IV |
| DCT_V | DST_IV |

The compactness measurement (equation (1)) produces a value of 29.76 for this combination of 5 pairs.

According to the third embodiment of the invention, combinations of partial subtransformations of sizes K×K and (N−K)×(N−K) are added to the initial set of subtransforms considered for learning. In the example of a 4×4 block, these are partial subtransforms of sizes 1×1 and 3×3 or 2×2 and 2×2. The subtransformations in this embodiment are of identity type. They are denoted $ID_1$ and $ID_2$ for the respective sizes 1 and 2.

These combinations are advantageously proposed in association with a complete transform. In other words, at least two partial subtransforms are broken down, either the transform $A_l$ or the transform $B_l$.

Learning is carried out from the set of transforms thus completed and, analogously to the previous case, the 5 pairs $A_1$, $B_1$ which contribute to the smallest compactness measurement are selected.

We obtain the following selection of transformations:

TABLE 4

| AI | BI |
|---|---|
| DST_VII | DST_VII |
| ID1, DST_IV | DCT_V |
| DST_IV | ID2, DST2_IV |
| DCT_V | ID1, DST_IV |
| DCT_V | DCT_VII |

A compactness measurement equal to 29.34 is obtained for this new combination, which is equivalent to an improvement of 1.38% in compactness compared to the state-of-the-art embodiment.

The invention is therefore remarkable in that it offers, in addition to a reduction in the number of operations as shown above, in relation to the first two embodiments, an improvement in the compression of the signal.

It should be noted that in the combinations presented, at least one of the partial subtransforms is equal to the identity and the other to a DST or DCT. Of course, the invention is not limited to these examples and covers the case of combinations of at least two more complex partial subtransforms, such as for example an ID and an adapted RDOT transform or a DST VII and an adapted RDOT transform.

The coding method produces a coded data stream representative of the at least one input image. The bit stream TB produced by the coding method according to the invention is for example transmitted in the form of a signal to a decoder or a receiver comprising a decoding device via a telecommunication network.

It is assumed that the bit stream TB has been received by a decoding device implementing the decoding method according to the invention. This decoding method will now be described in relation with FIG. 7.

In D0, the first block to be processed is initially selected as the current block C'. For example, this is the first block (in lexicographic order). This block has Nb pixels, for example 64×64 as specified in the HEVC standard for CTU blocks.

As described for the encoding method, the block current considered in the following may be the block C' itself or can be derived from a partition of the block C' into sub-blocks CU. It may further be a residue of a block obtained by subtracting a prediction of a sub-block CU or of the current block. We shall also designate by current block a sub-block derived from a division of a sub-block CU, residual or not, before its transformation by a transform $T_1$.

During a step D1, the coded data relating to the current block C' are read. The coded data includes coding parameters, such as, for example, the prediction mode used, or in a context of transform competition, a marking of an identifier of the transform applied to the current block and the values relating to the amplitudes and to the signs of the quantised residual coefficients of the current block.

When the determined prediction mode indicates that a prediction has been made by the coder, the current block is predicted at D2, according to the prediction mode determined from an already processed block. A predicted block Pr' is obtained.

During a step D3, the data coded representative quantised values, residual of the current block (values and signs of the coefficients) are decoded, and a one-dimensional vector of values RQ'[i] is formed with i being an integer between 0 and M×N−1. It is understood that this is the inverse operation of that of entropy coding previously described in relation to the coding method.

In D4, the data of the current block RQ'[i] are dequantised. A vector R'[i] is obtained.

In D5, a reorganisation of the data of the one-dimensional residual vector in the current block is performed, in a process that is the inverse of the current block path described in step E5 of FIG. 4.

In D6, the transform to be applied to the current block is identified. In known manner, and for example in accordance with the specifications of the HEVC standard, the decoder can access the identifier ID-TR of this transform, which has been previously associated with the prediction mode of the current block. More particularly, in a context of transform competition, the identifier of the transform can be received in the bit stream as a coding parameter, read during step D1 and then decoded. Whether in a context of transform competition or not, this transform identifier actually makes it possible to identify the two orthogonal or quasi-orthogonal transforms $A_I$ and $B_I$, which are successively applied to the current block.

According to the invention, at least one of the two substeps of transformations being implemented by the implementation of at least two partial subtransforms to disjoint subsets of elements of the column vectors respectively row vectors of the current block R', the step of identification of the transform therefore comprises obtaining an ordered list of identifiers of at least three transform identifiers, including two consecutive identifiers correspond to the partial sub-transforms of one of the transformation substeps and one identifier to the transform implemented in the other substep ($A_I$ or $B_I$). For example, for the second row of the table 4, the identifier obtained will include $A_I$=ID1, DST-IV and $B_I$=DCT-V.

In a step D7, the transforms ($A_I$, $B_I$) corresponding to the identifiers are applied to the dequantised data obtained at D6. This transform corresponds to the reverse operation to that performed at the coder. For example, if at coding, the transform $B_I$ was broken down into two partial subtransforms R and S, as shown in connection with FIG. 6A, the transposed transform $A_I^T$ of size M×M is first applied to the N transposed column vectors of the current residual block r' to obtain an intermediate residual block ri', then the two partial subtransforms of R and S constituting the transformation $B_I^T$ transposed are applied to each of the M row vectors transposed from the block ri', the subtransform R being applied to the first K elements and the subtransform S to the next N− K elements of each column vector. The substeps D721 for forming subvectors, D722 for applying transposed partial transforms and D743 for forming the transformed vector are shown in FIG. 5 already described for the coding method. At the end of the reverse transformation step, a signal or block r' in the spatial domain is then obtained.

Since the subtransforms applied to the decoder are transposed from those applied to the coder, the complexity generated is the same and therefore has an advantage over the state of the art.

In a step D8, the block of pixels c' of the decoded image is reconstructed from the block r' obtained and integrated with the image $I_D$ being decoded. If the block is a residual block, it is added the prediction Pr' of the current block obtained during step D2.

During a step D9, whether the current block is the last block to process the decoder, will be tested, given the order of travel defined above. If yes, the decoding process has finished its processing. If no, the next step is the step of selecting the next block D0 and the decoding steps D1 to D9 previously described are repeated for the next block selected.

It will be noted that the invention which has just been described can be implemented by means of software and/or hardware components. In this context, the terms "module" and "entity", used in this document, can correspond either to a software component, or to a hardware component, or to a set of hardware and/or software components, capable of implementing the function(s) described for the module or entity concerned.

In relation to FIG. 8, an example of a simplified structure of a device 100 for coding a digital image according to the invention is now presented. The device 100 implements the coding method according to the invention which has just been described in relation with FIG. 3.

For example, the device 100 comprises a processing unit 110, equipped with a processor $\mu_1$ and driven by a computer program $Pg_1$ 120, stored in a memory 130 and implementing the method according to the invention.

At initialisation, the code instructions of the computer program $Pg_1$ 120 are for example loaded into a RAM before being executed by the processor of the processing unit 110. The processor of the processing unit 110 implements the steps of the method described above, according to the instructions of the computer program 120.

In this embodiment of the invention, the device 100 comprises at least one transforming unit (TRANS) of the current block into a transformed block, said current block comprising M row vectors and N column vectors. The transforming unit is adapted to apply a first subtransform of the N row vectors transposed for providing an intermediate residual block formed from the transposed row vectors transformed and a second subtransformation of the M transposed row vectors of the intermediate block into transposed row vectors transformed from which the transformed block is formed. The device 100 further comprises an ENC coder of the transformed block coefficients and a bit stream INSERT constructor comprising coded data representative of the coded picture which is capable of inserting the coded coefficients. According to the invention, for at least one of said subtransformations, the transformer comprises the sub-units for forming at least a first subvector of size K<N or N respectively from adjacent elements of the input vector, for transforming the first subvector into a first transformed subvector by applying a partial subtransform of K×K size and building the transformed vector by insertion of said at least one first transformed subvector.

Advantageously, such a device 100 can be integrated into a user terminal TU. The device 100 is then arranged to cooperate at least with the next module of the terminal TU:
  a storage memory M1, able to store in particular the intermediate coded data, in particular in a context of transform competition; and
  a data transmission/reception module E/R, through which the bit stream TB or the compressed file FC is transmitted in a telecommunications network, for example a wired network or a radio network.

In relation to FIG. 9, an example of a simplified structure of a device 200 for decoding a digital image according to the invention is now presented. The device 200 implements the decoding method according to the invention which has just been described in relation with FIG. 7.

For example, the device 200 comprises a processing unit 210, equipped with a processor µ2 and driven by a computer program Pg₂ 220, stored in a memory 230 and implementing the method according to the invention.

At initialisation, the code instructions of the computer program Pg₂ 220 are for example loaded into a RAM before being executed by the processor of the processing unit 210. The processor of the processing unit 210 implements the steps of the method described above, according to the instructions of the computer program 120.

In this embodiment of the invention, the device comprises a decoder (DEC) of the coefficients of the current block transformed from coded data read in the bit stream, a reverse transformer (TRANS⁻¹) of the current block transformed into a decoded block, adapted to provide two successive reverse subtransformations, the first subtransformation producing an intermediate block and applied to column vectors, respectively row vectors of the current block, the second producing a block of pixels applicable to the row vectors, respectively the column vectors of the intermediate block, resulting from the first subtransformation.

According to the invention, the reverse transformer comprises the sub-units for forming at least one first subvector of size K<N or N respectively from adjacent elements of the input vector, for transforming the first sub vector into a first subvector transformed by application of a partial subtransform of size K×K and building the transformed vector by insertion of said at least one first transformed subvector.

The decoding device 200 further comprises an image constructor (RECONST), decoded from the decoded block.

Advantageously, such a device 200 can be integrated into a user terminal TU. The device 200 is then arranged to cooperate at least with the next module of the terminal TU:
a data transmission/reception module E/R, through which the bit stream TB or the compressed file FC is transmitted in a telecommunications network, for example a wired network or a radio network.

An exemplary embodiment of the invention improves the situation discussed above with respect to the prior art.

An exemplary embodiment of the invention particularly overcomes these disadvantages of the prior art.

More precisely, an exemplary embodiment of the invention proposes a solution that makes it possible to reduce the complexity of the calculations implemented when applying a transform to a block of pixels, to the coder as well as to the decoder.

An exemplary embodiment of the proposes a gain in complexity that has no impact on the efficiency in compression.

It goes without saying that the embodiments which have been described above have been given for purely indicative and non-limiting reasons, and that many modifications can easily be made by those skilled in the art without departing from the scope. of the invention.

The invention claimed is:

1. A method comprising the following acts performed by a decoding device:
   receiving from a communication network a bit stream comprising coded data representative of at least one digital image; and
   decoding the at least one digital image, said image being divided into a plurality of blocks processed in a defined order, said decoding comprising the following steps, implemented for a current block:
   decoding coefficients of the current block from the coded data read in the bit stream;
   transforming the current block into a transformed decoded block, said current block comprising M row vectors and N column vectors, with M and N being non-zero integers, said transforming step implementing a first sub step to produce an intermediate block, that applies to the column vectors respectively row vectors of the current block, and a second substep to produce a block of pixels that applies to the row vectors respectively column vectors of the intermediate block, resulting from the first substep;
   rebuilding the image from the transformed decoded block;
   wherein:
   at least one of said first and second transformation substeps comprises, for a row vector respectively a column vector, called an input vector of the current block:
   forming a first subvector of size K<N respectively M from adjacent elements of the input vector and at least one second subvector of size equal to N−K or M−K respectively from adjacent elements of the input vector, not included in the first sub-vector, such that the sum of the sizes of the formed subvectors is equal to the size of the input vector;
   transforming the first subvector into a first transformed subvector by applying a first partial subtransform of size K×K and transforming the second subvector into a second transformed subvector by applying a second subtransform of size (N−K)×(N−K); and
   building a transformed input vector of the intermediate block for the first transformation substep, respectively of the transformed decoded block for the second transformation step, by inserting the first transformed subvector and the at least one second transformed subvector.

2. The method according to claim 1, wherein the first and second subtransforms are of different types.

3. The method according to claim 1, wherein one of the at least two partial subtransforms is an identity transform.

4. The method according to claim 1, wherein said at least two subvectors are of different sizes.

5. The method according to claim 1, wherein at least one of the subvectors of the input vector is odd in number.

6. A decoding device comprising:
   a processor; and
   a non-transitory computer-readable medium comprising instructions stored thereon, which when executed by the processor configure the decoding device to perform acts comprising:
   receiving from a communication network a bit stream comprising coded data representative of at least one digital image; and
   decoding the at least one digital image, said image being divided into a plurality of blocks processed in a defined order, wherein the decoding implements, for a current block block:
   decoding coefficients of the current block from the coded data read in the bit stream;
   transforming the current block into a decoded block, said current block comprising M row vectors and N columns vectors, with M and N being non-zero integers, said transforming implementing a first transforming producing an intermediate block, applying to the column vectors respectively row vectors of the current block, and a second transforming producing a block of pixels applying to the row vectors respectively column vectors of the intermediate block, resulting from the first transforming;
   rebuilding the image from the decoded block;
   wherein:
   at least one of said first and second transforming comprises, for a row vector respectively a column vector, called an input vector:
   forming a first subvector of size K<N respectively M from adjacent elements of the input vector and at least one second subvector of size equal to N−K or M−K respectively from adjacent elements of the input vector, not included in the first subvector, such that the sum of the sizes of the formed subvectors is equal to the size of the input vector;

transforming the first subvector into a first transformed subvector by applying a first partial subtransform of size K×K and transforming the second subvector into a second transformed subvector by applying a second subtransform of size (N−K)×(N−K); and building the transformed vector of the intermediate block for the first transforming, respectively of the transformed decoded block for the second transforming, by inserting the first transformed subvector and the at least one second transformed subvector.

7. The decoding device according to claim 6, wherein the decoding device is implemented in a user terminal.

8. A non-transitory computer-readable medium comprising a computer program stored thereon, which comprises instructions for implementing a decoding method when executed by a processor of a decoding device, wherein the method comprises:

receiving from a communication network a bit stream comprising coded data representative of at least one digital image; and decoding the at least one digital image, said image being divided into a plurality of blocks processed in a defined order, said decoding comprising the following steps, implemented for a current block:

decoding coefficients of the current block from the coded data read in the bit stream;

transforming the current block into a transformed decoded block, said current block comprising M row vectors and N column vectors, with M and N being non-zero integers, said transforming step implementing a first sub step to produce an intermediate block, that applies to the column vectors respectively row vectors of the current block, and a second substep to produce a block of pixels that applies to the row vectors respectively column vectors of the intermediate block, resulting from the first substep;

rebuilding the image from the transformed decoded block;

wherein:

at least one of said first and second transformation substeps comprises, for a row vector respectively a column vector, called an input vector of the current block:

forming a first subvector of size K<N respectively M from adjacent elements of the input vector and at least one second subvector of size equal to N−K or M−K respectively from adjacent elements of the input vector, not included in the first sub-vector, such that the sum of the sizes of the formed subvectors is equal to the size of the input vector;

transforming the first subvector into a first transformed subvector by applying a first partial subtransform of size K×K and transforming the second subvector into a second transformed subvector by applying a second subtransform of size (N−K)×(N−K); and building a transformed input vector of the intermediate block for the first transformation substep, respectively of the transformed decoded block for the second transformation step, by inserting the first transformed subvector and the at least one second transformed subvector.

9. A method comprising the following acts performed by an encoding device:

encoding at least one digital image, said image being divided into a plurality of blocks of pixels processed in a defined order, said encoding comprising the following steps, implemented for a current block of predetermined dimensions:

transforming the current block into a transformed block, said current block comprising M row vectors and N column vectors, with M and N being non-zero integers, said transforming comprising a first substep of transformation of the M row vectors, respectively column vectors, to provide an intermediate block formed from the transformed row vectors, respectively column vectors, and a second substep of transformation of the N column vectors, respectively row vectors of the intermediate block;

encoding the transformed block to produce coded data representative of the transformed block;

inserting the coded data into a bit stream representative of the coded image; and transmitting the bit stream over a communication network;

wherein at least one of said first and second transformation substeps comprises, for a row vector respectively a column vector, called an input vector:

forming a first subvector of size K<N respectively N from adjacent elements of the input vector and at least one second subvector of size equal to N−K respectively M−K respectively from adjacent elements of the input vector, not included in the first sub-vector, such that the sum of the sizes of the formed subvectors is equal to the size of the input vector;

transforming the first subvector into a first transformed subvector by applying a first partial subtransform of size K×K and transforming the second subvector into a second transformed subvector by applying a second subtransform of size (N−K)×(N−K); and building a transformed row vector respectively a transformed column vector of the intermediate block for the first transformation substep, respectively of the decoded block transformed for the second transformation step, by inserting the first transformed subvector and the at least one second transformed subvector.

10. An encoding device comprising:

a processor; and a non-transitory computer-readable medium comprising instructions stored thereon, which when executed by the processor configure the encoding device to perform acts comprising:

encoding at least one digital image, said image being divided into a plurality of blocks of pixels processed in a defined order, said encoding comprising the following steps, implemented for a current block of predetermined dimensions:

transforming the current block into a transformed block, said current block comprising M row vectors and N column vectors, with M and N being non-zero integers, said transforming comprising a first transformation of the M row vectors, respectively column vectors, to provide an intermediate block formed from the transformed row vectors, respectively transformed column vectors, and a second transformation of the M column vectors, respectively row vectors of the intermediate block;

encoding the transformed block to produce coded data representative of the transformed block;

building a bit stream representative of the coded image configured to insert said coded data in the bit stream; and transmitting the bit stream over a communication network;
wherein
at least one of said first and second transformations comprises, for a row vector respectively a column vector, called input vector:
forming a first subvector of size K<N respectively M from adjacent elements of the input vector and at least one second subvector of size equal to N−K respectively M−K respectively from adjacent elements of the input vector, not included in the first sub-vector, such that the sum of the sizes of the formed subvectors is equal to the size of the input vector;
transforming the first subvector into a first transformed subvector by applying a first partial subtransform of size K×K and transforming the second subvector into a second transformed subvector by applying a second subtransform of size (N−K)×(N−K); and
building a transformed row vector, respectively a transformed column vector, of the intermediate block for the first transformation, respectively of the transformed decoded block for the second transformation, by inserting the at least one first transformed subvector and the at least one second transformed subvector.

11. A non-transitory computer-readable medium comprising a computer program stored thereon, which comprises instructions for implementing an encoding method when executed by a processor of an encoding device, wherein the method comprises:
encoding at least one digital image, said image being divided into a plurality of blocks of pixels processed in a defined order, said encoding comprising the following steps, implemented for a current block of predetermined dimensions:
transforming the current block into a transformed block, said current block comprising M row vectors and N column vectors, with M and N being non-zero integers, said transforming comprising a first substep of transformation of the M row vectors, respectively column vectors, to provide an intermediate block formed from the transformed row vectors, respectively column vectors, and a second sub step of transformation of the N column vectors, respectively row vectors of the intermediate block;
encoding the transformed block to produce coded data representative of the transformed block;
inserting the coded data into a bit stream representative of the coded image; and
transmitting the bit stream over a communication network;
wherein
at least one of said first and second transformation substeps comprises, for a row vector respectively a column vector, called an input vector:
forming a first subvector of size K<N respectively N from adjacent elements of the input vector and at least one second subvector of size equal to N−K respectively M−K respectively from adjacent elements of the input vector, not included in the first sub-vector, such that the sum of the sizes of the formed subvectors is equal to the size of the input vector;
transforming the first subvector into a first transformed subvector by applying a first partial subtransform of size K×K and transforming the second subvector into a second transformed subvector by applying a second subtransform of size (N−K)×(N−K); and
building a transformed row vector respectively a transformed column vector of the intermediate block for the first transformation substep, respectively of the decoded block transformed for the second transformation step, by inserting the first transformed subvector and the at least one second transformed subvector.

12. The encoding device according to claim 10, wherein the encoding device is implemented in a user terminal.

\* \* \* \* \*

UNITED STATES PATENT AND TRADEMARK OFFICE
CERTIFICATE OF CORRECTION

PATENT NO. : 10,771,817 B2
APPLICATION NO. : 16/092359
DATED : September 8, 2020
INVENTOR(S) : Pierrick Philippe et al.

Page 1 of 1

It is certified that error appears in the above-identified patent and that said Letters Patent is hereby corrected as shown below:

In the Claims

Column 18, Claim 6, Line 48, please delete the word "block" between the words "current" and "block".

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*